United States Patent [19]
Cheng et al.

[11] Patent Number: 5,937,798
[45] Date of Patent: Aug. 17, 1999

[54] METHOD OF CONTROLLING THE AIR TO FUEL RATIO IN A FLEXIBLE FUELED VEHICLE DURING WIDE OPEN THROTTLE OR PART THROTTLE ENRICHMENT OPERATION

[75] Inventors: Yi Cheng, Jackson; Shean Huff, Ann Arbor; Robert J. Nankee, II, Canton; Mary Joyce, Farmington Hills; Jerry Kennie, Canton; Gary L. Seitz, Chelsea, all of Mich.

[73] Assignee: Karin Rak, Auburn Hills, Mich.

[21] Appl. No.: 08/959,818

[22] Filed: Oct. 29, 1997

[51] Int. Cl.⁶ .................................................. F02B 75/12
[52] U.S. Cl. ........................ 123/1 A; 123/681; 123/683
[58] Field of Search ................................ 123/1 A, 672, 123/681, 683, 684, 689

[56] References Cited

U.S. PATENT DOCUMENTS

| | | |
|---|---|---|
| 5,255,661 | 10/1993 | Nankee, II et al. . |
| 5,335,637 | 8/1994 | Davis et al. ............................... 123/478 |
| 5,365,917 | 11/1994 | Adams et al. ........................... 123/491 |
| 5,400,762 | 3/1995 | Fodale et al. . |
| 5,415,145 | 5/1995 | Letcher et al. ........................... 123/491 |
| 5,435,285 | 7/1995 | Adams et al. . |
| 5,467,755 | 11/1995 | Konrad et al. . |
| 5,492,106 | 2/1996 | Sharma et al. ........................... 123/681 |
| 5,497,753 | 3/1996 | Kopera . |
| 5,520,162 | 5/1996 | Rotramel et al. . |

*Primary Examiner*—John Kwon
*Attorney, Agent, or Firm*—Mark P. Calcaterra

[57] ABSTRACT

The present invention provides a method for controlling combustion parameters of an internal combustion engine during wide open throttle or part throttle enrichment operation. Oxygen sensor rich and lean counts above and below a stoichiometric air/fuel ratio are counted during an injector pulse width period while a fuel concentration determination is being made at wide open throttle and part throttle enrichment. The ratio of lean counts to rich counts is compared to a calibratable value for incrementing the fuel concentration delivered to the internal combustion engine. The fuel concentration is further controlled if a boil-off condition is detected.

19 Claims, 1 Drawing Sheet

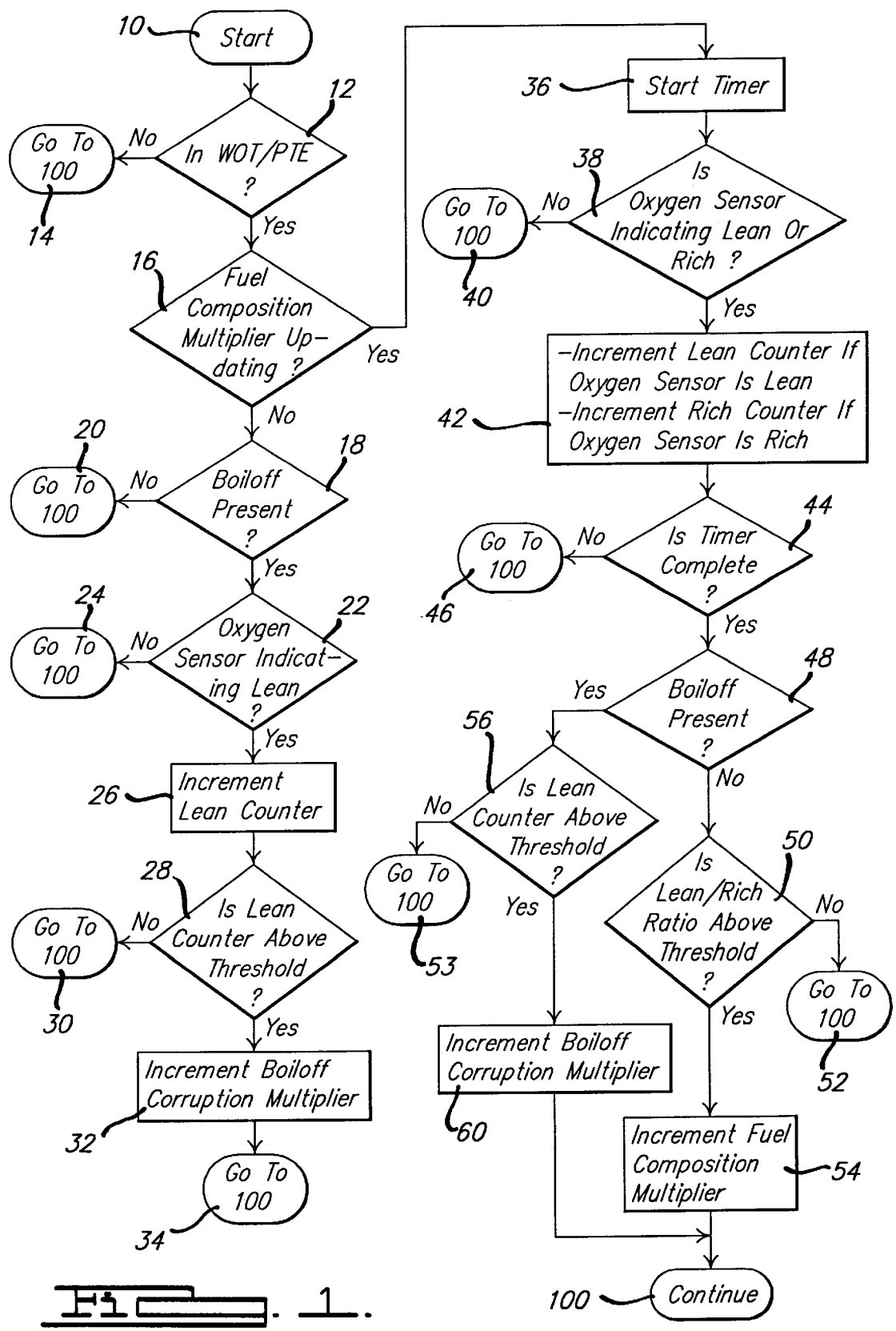

METHOD OF CONTROLLING THE AIR TO FUEL RATIO IN A FLEXIBLE FUELED VEHICLE DURING WIDE OPEN THROTTLE OR PART THROTTLE ENRICHMENT OPERATION

BACKGROUND OF THE INVENTION

1. Technical Field

The present invention relates generally to fuel control systems and, more particularly, to a method of controlling combustion parameters of an internal combustion engine in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being supplied in proportion to the amount of air to achieve perfect combustion. Likewise, if the air/fuel ratio is greater than stoichiometric, an engine is said to be operating lean, i.e., too much air is being supplied in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

When the engine is operating in wide-open throttle or part throttle enrichment conditions, the fuel system is not in an oxygen feedback closed loop mode. In these conditions, the engine operates in a rich of stoichiometric air/fuel ratio. Previously, there was no method to update the alcohol fuel concentration value during open loop wide open throttle and part throttle enrichment operating conditions.

Therefore, it would be desirable to provide a feedback system to ensure a rich of stoichiometric air/fuel ratio for system durability at wide open throttle and part throttle enrichment conditions.

SUMMARY OF THE INVENTION

It is, therefore, one object of the present invention to provide a system of flexible fuel compensation.

It is another object of the present invention to provide a flexible fuel compensation system which updates the alcohol fuel concentration learned during wide open throttle and part throttle enrichment engine operation.

It is yet another object of the present invention to provide a flexible fuel compensation system that updates the alcohol fuel concentration during high alcohol PCV flow corruption conditions when operating at wide open throttle and part throttle enrichment.

The above and other objects are provided by a method of controlling combustion parameters in an internal combustion engine of a flexible fueled vehicle during wide open throttle or part throttle enrichment operation. According to the present invention, oxygen sensor rich and lean counts above and below a stoichiometric air/fuel ratio are counted during an injector pulse width period at wide open throttle and part throttle enrichment during a fuel concentration determination. The ratio of lean counts to rich counts is compared to a calibratable threshold for incrementing the fuel concentration if necessary. The fuel concentration is further controlled if a boil-off condition is detected.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a flow chart of a method for controlling combustion parameters of an internal combustion engine of a flexible fueled vehicle during wide open throttle or part throttle enrichment operation.

DETAILED DESCRIPTION OF THE PREFERRED EMBODIMENTS

The present invention is directed towards updating of an alcohol fuel concentration and maintaining of rich wide open throttle and part throttle enrichment operation while changing from one blend of alcohol fuel to a different blend of alcohol fuel. During wide open throttle or part throttle enrichment operation, an oxygen sensor signal is sampled. If the oxygen sensor signal is below a lean threshold, a lean counter is incremented. If the oxygen sensor signal is above a rich threshold, a rich counter is incremented. At the end of a given time period, an inferred alcohol content of the fuel is incremented if the ratio of the lean counter to the rich counter is above a calibratable value. Also, during certain driving conditions in cold ambient temperatures with alcohol based fuels, the fuel required to be delivered to the fuel injectors can be greatly reduced at low engine airflows due to a large alcohol concentration influence in the fueling from the PCV system (i.e., crankcase vapors). This PCV concentration is reduced at high airflows such as wide open throttle and part throttle enrichment which results in a lean of stoichiometric air/fuel ratio. According to the present invention, during these conditions, an oxygen sensor lean count is incremented. When this count exceeds a given threshold, the fuel delivered by the injectors is increased to maintain a rich operation. As such, the methodology of the present invention enables maintaining of wide open throttle and part throttle enrichment engine operation when the fuel requirements are corrupted by large concentrations of alcohol in the PCV flow.

During wide open throttle and part throttle enrichment operation, typical fuel control systems are not operating in a closed loop oxygen sensor feedback mode. Therefore, the normal closed loop update (i.e., based on oxygen sensor feedback data) of inferred alcohol content in the fuel after a fuel fill event cannot be used. Under these conditions, a ratio of an oxygen sensor signal lean time to rich time is used to indicate fueling requirements. Although the present invention is well suited for use in conjunction with a number of fuel control systems, a preferred fuel control system using oxygen sensor feedback data to infer alcohol content of fuel is disclosed in U.S. Ser. No. 08/958,411, entitled "Method of Determining a Fuel Composition in a Flexible Fueled Vehicle" to Nankee II et al. which is incorporated by reference herein.

According to the present invention, the wide open throttle or part throttle enrichment update of the inferred alcohol content is performed based on an injector pulse width accumulation step size. The pulse width accumulation is used because it is a direct measure of the amount of fuel being delivered to the engine. Therefore, it is related to how quickly the fuel requirement can change.

During each pulse width accumulation step, the oxygen sensor signal is sampled three times per engine revolution. If the oxygen sensor signal is below a lean threshold, a lean counter is incremented. If the oxygen sensor signal is above a rich threshold, a rich counter is incremented. At the end of the pulse width accumulation step, if the ratio of the lean counter to the rich counter is above a calibratable value, the inferred ethanol content is incremented.

Additionally, when cold starting a vehicle that is fueled with alcohol, some of the injected fuel remains in a liquid state and accumulates in the engine oil. When the oil temperature reaches the boiling point of alcohol (approximately 170 degrees), the alcohol in the engine oil begins to vaporize and is introduced into the engine through the crank case ventilation system. These vapors can potentially cause a high level of rich corruption until all of the alcohol in the engine oil is vaporized. This condition is referred to as boil-off.

The fuel corruption level due to boil-off is inversely proportional to engine airflow. Since wide open throttle and part throttle enrichment are the upper limits of airflow, the engine might operate lean under these conditions even when it is stoichiometric or rich under lower airflow conditions. This causes a problem because wide open throttle and part throttle enrichment are open loop conditions without any oxygen sensor feedback data upon which to base fuel concentration determinations. To protect against this problem, the present invention employs a lean at wide open throttle or part throttle enrichment update.

When an inferred alcohol content update is triggered during a boil-off condition, the wide open throttle or part throttle enrichment update rate of the current inferred alcohol content value is performed based on an injector pulse width accumulation step size. Again, the pulse width accumulation is used because it is a direct measure of the amount of fuel being delivered to the engine.

During each pulse width accumulation step, the oxygen sensor signal is sampled three times per engine revolution. If the oxygen sensor signal is below a lean threshold, a lean counter is incremented. If the lean counter is above a calibratable threshold at the end of the pulse width accumulation step, a boil-off corruption multiplier is incremented. The boil-off corruption multiplier is used to change the fuel delivered to the engine during a boil-off condition over non-boil-off fueling which is based on an unmodified inferred alcohol content.

When the inferred ethanol content update has not been triggered during a boil-off condition, the injector pulse width accumulation is not tabulated. Therefore, an alternate source is used for the update rate of the current boil-off corruption multiplier. Under these conditions, the oxygen sensor signal is sampled three times per engine revolution and a lean counter is incremented when the oxygen sensor signal is below a lean threshold. When the lean counter exceeds a calibratable threshold, the current boil-off corruption multiplier value is incremented. Since the rate that the lean counter increments is based on engine speed, the increment rate of the current boil-off corruption multiplier is also based on engine speed.

Turning now to the drawing FIGURE, FIG. 1 illustrates a flow-chart for a method of flexible fuel compensation control during wide open throttle and part throttle enrichment operation. The methodology starts in bubble 10 and falls through to decision block 12. In decision block 12, the methodology determines if the internal combustion engine is operating in either a wide open throttle or a part throttle enrichment mode. If not, the methodology advances to bubble 14 where it is forwarded to bubble 100 and returned to start-up bubble 10.

If the internal combustion engine is operating in either a wide open throttle or part throttle enrichment mode at decision block 12, the methodology advances to decision block 16. In decision block 16, the methodology determines if the fuel composition multiplier is updating. The fuel composition multiplier corresponds to the inferred alcohol content and controls the amount of fuel delivered to the engine. If the fuel composition multiplier is not updating, the methodology advances to decision block 18 and determines if a boil-off condition is occurring. This is determined by noting the coolant temperature of the engine and the inferred ethanol content.

If no boil-off condition exists, the methodology advances to bubble 20 where it is forwarded to bubble 100 and returned to start-up bubble 10. However, if a boil-off condition is occurring at decision block 18, the methodology advances to decision block 22. In decision block 22, the methodology determines if the oxygen sensor signal is indicating a lean fuel to air ratio. If not, the methodology advances to bubble 24 where it is forwarded to bubble 100 and returned to start-up bubble 10. However, if the oxygen sensor signal is indicating a lean fuel to air ratio at decision block 22, the methodology advances to block 26 and increments a lean counter.

After incrementing the lean counter in block 26, the methodology advances to decision block 28. In decision block 28, the methodology determines if the lean counter is above a first threshold. If not, the methodology advances to bubble 30 where it is forwarded to bubble 100 and returned to start-up bubble 10.

If the lean counter is above the first threshold at decision block 28, the methodology advances to block 32 and increments a boil-off corruption multiplier to effect engine fueling. After incrementing the boil-off corruption multiplier at block 32, the methodology advances to bubble 34 where it is forwarded to bubble 100 and returned to start-up bubble 10.

Referring again to decision block 16, if the fuel composition multiplier is updating, the methodology advances to block 36. In block 36, the methodology starts a pulse width accumulation timer. After starting the pulse width accumulation timer at block 36, the methodology advances to decision block 38.

In decision block 38, the methodology determines if the oxygen sensor is indicating either a lean or a rich fuel to air ratio. If not, the methodology advances to bubble 40 where it is forwarded to bubble 100 and returned to start-up bubble 10. However, if the oxygen sensor signal is indicating either a lean or a rich fuel to air ratio at decision block 38, the methodology advances to block 42.

In block 42, the methodology increments a lean counter if the oxygen sensor is indicating a lean fuel to air ratio or increments a rich counter if the oxygen sensor is indicating a rich fuel to air ratio. After incrementing the lean counter or rich counter at block 42, the methodology advances to decision block 44 and determines if the pulse width accumulation timer has expired. If not, the methodology advances to bubble 46 where it is forwarded to bubble 100 and returned to start-up bubble 10.

If the pulse width accumulation timer has expired at decision block 44, the methodology advances to decision block 48. In decision block 48, the methodology determines if a boil-off condition is occurring. If not, the methodology advances to decision block 50. In decision block 50, the methodology determines if a ratio of the lean counter to the rich counter is above given threshold. If not, the methodology advances to bubble 52 where it is forwarded to bubble 100 and returned to start-up bubble 10. However, if the ratio of the lean counter to the rich counter is above the given threshold at decision block 50, the methodology advances to block 54 and increments the fuel composition multiplier to effect a change in engine fueling parameters.

Returning to decision block 48, if a boil-off condition is occurring, the methodology advances to decision block 56. In decision block 56, the methodology determines if the lean counter is above a second threshold. If not, the methodology advances to bubble 58 where it is forwarded to bubble 100 and returned to start-up bubble 10. However, if the lean counter is above the second threshold at decision block 56, the methodology advances to block 60 and increments a boil-off corruption multiplier. After incrementing the boil-off corruption multiplier at block 60, or incrementing the fuel composition multiplier at block 54, the methodology advances to bubble 100 where it is returned to start-up bubble 10.

According to the above, the present invention provides a method for controlling combustion parameters of an internal combustion engine during wide open throttle or part throttle enrichment operation. Oxygen sensor rich and lean counts above and below a stoichiometric air/fuel ratio are counted during an injector pulse width period while a fuel concentration determination is being made at wide open throttle and part throttle enrichment. This lean/rich ratio is compared to a lean threshold for incrementing the fuel concentration delivered to the internal combustion engine. The fuel concentration is further controlled if a boil-off condition is detected.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling combustion parameters of an internal combustion engine comprising:

detecting a high airflow condition in said engine;

sampling an oxygen sensor signal a plurality of times in a predetermined period of time;

incrementing a lean counter each time said oxygen sensor signal is below a lean threshold within said predetermined period of time;

incrementing a rich counter each time said oxygen sensor signal is above a rich threshold within said predetermined period of time;

determining a ratio of said lean counter to said rich counter at an end of said predetermined period of time;

incrementing an inferred percent alcohol content value if the ratio of said lean counter to said rich counter is above a calibratable threshold; and setting said combustion parameters according to said inferred percent alcohol content value.

2. The method of claim 1 further comprising;

detecting a boil-off condition;

comparing said lean counter to a second calibratable threshold;

incrementing a boil-off corruption multiplier value if said lean counter is above said second calibratable threshold; and adjusting said combustion parameters according to said boil-off corruption multiplier.

3. The method of claim 2 wherein said second calibratable threshold corresponds to a stoichimetric fuel to air condition in said engine.

4. The method of claim 1 wherein said high airflow condition further comprises a wide open throttle operating condition.

5. The method of claim 1 wherein said high airflow condition further comprises a part throttle enrichment operating condition.

6. The method of claim 1 wherein said period of time further comprises a fuel injector pulse width accumulation step.

7. The method of claim 1 wherein said step of sampling said oxygen sensor signal further comprises sampling said oxygen sensor signal about three times during each fuel injector pulse width accumulation step per engine revolution.

8. The method of claim 1 wherein said calibratable threshold corresponds to a stoichimetric fuel to air condition in said engine.

9. A method of controlling combustion parameters of an internal combustion engine comprising:

detecting a high airflow condition in said engine;

detecting a boil-off condition in said engine;

sensing a lean or rich state of an oxygen sensor during said boil-off condition;

incrementing a lean counter if said oxygen sensor signal is lean during said boil-off condition;

comparing said lean counter to a given threshold;

incrementing a boil-off corruption multiplier if said lean counter is greater than said given threshold; and setting said combustion parameters according to an inferred percent alcohol content value as modified by said boil-off corruption multiplier.

10. The method of claim 9 wherein said high airflow condition further comprises a wide open throttle operating condition.

11. The method of claim 9 wherein said high airflow condition further comprises a part throttle enrichment operating condition.

12. The method of claim 9 wherein said given threshold corresponds to a stoichimetric fuel to air condition in said engine.

13. A method of controlling combustion parameters of an internal combustion engine comprising:

detecting a high airflow condition in said engine;

sampling an oxygen sensor signal a plurality of times in a predetermined period of time;

incrementing a lean counter each time said oxygen sensor signal is lean during said predetermined period of time;

incrementing a rich counter each time said oxygen sensor signal is rich during said predetermined period of time;

determining a ratio of said lean counter to said rich counter;

determining if a boil-off condition is present;

incrementing a fuel composition multiplier if said boil-off condition is not present and said ratio of said lean counter to said rich counter is greater than a given threshold;

incrementing a boil-off corruption multiplier if said boil-off condition is present and said ratio of said lean counter to said rich counter is above said given threshold; and setting said combustion parameters according to said fuel composition multiplier during non-boil-off operation and said boil-off corruption multiplier during boil-off operation.

14. The method of claim 13 wherein said high airflow condition further comprises a wide open throttle operating condition.

15. The method of claim 13 wherein said high airflow condition further comprises a part throttle enrichment operating condition.

16. The method of claim 13 wherein said period of time further comprises a fuel injector pulse width accumulation step.

17. The method of claim 13 wherein said step of sampling said oxygen sensor signal further comprises sampling said oxygen sensor signal about three times during each fuel injector pulse width accumulation step per engine revolution.

18. The method of claim 13 wherein said given threshold corresponds to a stoichimetric fuel to air condition in said engine.

19. The method of claim 13 further comprising detecting a fuel composition multiplier update requirement prior to said step of sampling said oxygen sensor signal.

* * * * *

UNITED STATES PATENT AND TRADEMARK OFFICE
CERTIFICATE OF CORRECTION

PATENT NO : 5,937,798
DATED : August 17, 1998
INVENTOR(S) : Cheng et al.

It is certified that error appears in the above-identified patent and that said Letters Patent is hereby corrected as shown below:

On the title page, item [73]

Assignee Section, please change "Karin Rak," to --Chrysler Corporation--.

Signed and Sealed this

Fifteenth Day of February, 2000

Attest:

Q. TODD DICKINSON

*Attesting Officer*       *Commissioner of Patents and Trademarks*